(12) United States Patent
Parker

(10) Patent No.: US 9,039,345 B2
(45) Date of Patent: *May 26, 2015

(54) LAYER FORMATION TABLE AND PROCESS

(71) Applicant: KAUFMAN ENGINEERED SYSTEMS, Waterville Road, OH (US)

(72) Inventor: Jonathan D. Parker, Sylvania, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 14/294,371

(22) Filed: Jun. 3, 2014

(65) Prior Publication Data

US 2015/0037126 A1   Feb. 5, 2015

Related U.S. Application Data

(63) Continuation of application No. 12/011,890, filed on Jan. 30, 2008, now Pat. No. 8,770,909.

(60) Provisional application No. 60/997,087, filed on Oct. 1, 2007, provisional application No. 60/898,499, filed on Jan. 31, 2007.

(51) Int. Cl.
*B66C 1/00* (2006.01)
*B65G 47/32* (2006.01)
(Continued)

(52) U.S. Cl.
CPC ........... *B65G 47/32* (2013.01); *Y10T 74/20305* (2013.01); *B65B 21/06* (2013.01); *B65G 47/53* (2013.01); *B65G 47/8815* (2013.01); *B65G 57/03* (2013.01); *B65G 2201/0244* (2013.01)

(58) Field of Classification Search
CPC ............ B25J 9/144; B25J 9/042; B25J 9/023; B25J 15/0033; B25J 15/0019; B65G 47/082; B65G 47/34; B65G 47/90; B65G 47/91; B65G 47/902; B65G 61/00; B23Q 7/04; B23Q 7/043; B65B 21/04; B65B 21/06; B65B 35/40; B65B 5/105; B65B 5/106
USPC .............. 414/729, 788.1, 222.01, 799, 744.2, 414/744.3, 791.6, 791.8, 792.1, 788, 790.3, 414/790.2; 901/7, 41; 198/418, 426, 429, 198/430, 431, 468.01, 468.9; 74/490.01; 53/443, 447, 448, 147, 149, 540, 541, 53/543, 544
See application file for complete search history.

(56) References Cited

U.S. PATENT DOCUMENTS 3,090,502 A * 5/1963 Gunzelmann .............. 414/792.9
3,543,949 A * 12/1970 Weier ......................... 414/796.8
(Continued)

*Primary Examiner* — Saul Rodriguez
*Assistant Examiner* — Glenn Myers
(74) *Attorney, Agent, or Firm* — Endurance Law Group, PLC

(57) ABSTRACT

An apparatus for transferring articles is disclosed herein. The apparatus includes a layer formation table. The apparatus also includes means for supplying articles to the layer formation table. At least one row of the articles is formed at a first end of the layer formation table. The apparatus also includes a programmable robot including an end of arm tool for transferring the at least one row of the articles towards a second end of the layer formation table. The programmable robot is configured to form a plurality of rows of articles on the layer formation table. Each of the rows comprises a plurality of articles in side by side contact creating a void between adjacent articles in each of the rows. The programmable robot is configured to nest the articles of one of the rows in the voids of an adjacent row. The end of arm tool includes a multiplicity of guides which form lanes. The rows of articles fill the lanes. The end of arm tool includes clamping tools which lock the individual rows of articles between the guides.

20 Claims, 6 Drawing Sheets

(51) Int. Cl.
*B65G 47/53* (2006.01)
*B65G 47/88* (2006.01)
*B65G 57/03* (2006.01)
*B65B 21/06* (2006.01)

(56) References Cited

U.S. PATENT DOCUMENTS

| | | | | |
|---|---|---|---|---|
| 3,555,770 | A | * | 1/1971 | Rowekamp .................... 53/495 |
| 3,718,246 | A | * | 2/1973 | Dardaine et al. ........... 198/419.3 |
| 3,731,785 | A | * | 5/1973 | Stuart ........................... 198/434 |
| 3,924,756 | A | * | 12/1975 | Milholen et al. ........... 414/791.9 |
| 3,979,878 | A | * | 9/1976 | Berney .......................... 53/495 |
| 4,013,183 | A | * | 3/1977 | Milholen et al. .............. 414/802 |
| 4,290,517 | A | * | 9/1981 | Hafferkamp ................. 198/427 |
| 4,466,532 | A | * | 8/1984 | Minneman et al. ...... 198/468.01 |
| 4,607,476 | A | * | 8/1986 | Fulton, Jr. ..................... 53/399 |
| 5,005,335 | A | * | 4/1991 | Yourgalite et al. ............. 53/399 |
| 5,553,442 | A | * | 9/1996 | Fadaie ............................ 53/445 |
| 5,775,056 | A | * | 7/1998 | Rauhala et al. ................. 53/397 |
| 6,035,995 | A | * | 3/2000 | Leidy et al. ................... 198/430 |
| 6,047,523 | A | * | 4/2000 | Eyre et al. ..................... 53/399 |
| 6,082,080 | A | * | 7/2000 | Holter et al. .................... 53/540 |
| 6,192,658 | B1 | * | 2/2001 | Yamagishi et al. ............. 53/415 |
| 6,216,422 | B1 | * | 4/2001 | Christ et al. .................... 53/397 |
| 6,328,153 | B1 | * | 12/2001 | Manghi et al. ................. 198/736 |
| 6,658,816 | B1 | * | 12/2003 | Parker et al. .................... 53/397 |
| 6,695,569 | B2 | * | 2/2004 | Hofer .......................... 414/792.9 |
| 6,793,064 | B2 | * | 9/2004 | Schoeneck et al. ......... 198/419.3 |
| 7,000,365 | B2 | * | 2/2006 | Nutley et al. .................... 53/397 |
| 7,021,029 | B2 | * | 4/2006 | Hannen et al. .................. 53/459 |
| 7,325,668 | B2 | * | 2/2008 | Borsarelli et al. ............. 198/430 |
| 7,409,812 | B2 | * | 8/2008 | Gilmore et al. ................. 53/475 |
| 7,784,599 | B2 | * | 8/2010 | Balleza et al. ................. 198/432 |
| 2002/0070097 | A1 | * | 6/2002 | Ritter et al. ................. 198/626.1 |
| 2005/0056521 | A1 | * | 3/2005 | Keyes ......................... 198/418.5 |
| 2005/0063815 | A1 | * | 3/2005 | Pierson et al. ................. 414/799 |
| 2006/0016094 | A1 | * | 1/2006 | Covert ............................ 34/217 |

* cited by examiner

LAYER FORMATION TABLE AND PROCESS

CROSS-REFERENCE TO RELATED APPLICATIONS

This application is a continuation of U.S. patent application Ser. No. 12/011,890, for a LAYER FORMATION TABLE AND PROCESS, currently pending and filed Jan. 30, 2008, which further claims the benefit of U.S. Provisional Patent Application Ser. No. 60/997,087, filed on Oct. 1, 2007, and U.S. Provisional Patent Application Ser. No. 60/898,499, filed on Jan. 31, 2007, all of these applications are hereby incorporated by reference in their entireties.

BACKGROUND OF THE INVENTION

1. Field of the Invention

This invention relates to a case/bulk layer formation table and process including a multi-axis programmable, robot.

2. Description of Related Prior Art

Conveyors are commonly used in manufacturing and processing operations to move articles or goods from one operation to another. For many types of operation it is advantageous to have the articles grouped for batch processing. Such typical batch-processing operations include applying labels to bottles or cans or other types of containers, packing bottles, cans or boxes into crates, or filling containers with liquid or semi-liquid material. A number of devices or systems are known that group articles for batch processing. Many of the systems known in the prior art use a system that run alongside one side or both sides of the conveyor transporting the articles to be processed.

The prior art devices have several disadvantages. They are cumbersome and require space to each side of the conveyor and above the conveyor. They also are material-intensive and thus, expensive. Further they also are power-intensive because they run continuously. Furthermore, these devices do not change configuration of the number of articles abreast, i.e., they do not convert a single or double file feed of articles to multiple articles abreast, but merely create a distance between one group of rows of articles and a following group.

Typically prior art transfer is carried out with an overhead frame. The prior art unit uses a complicated system including assemblies extending transversely of the apparatus in and being vertically movable toward and away from one another in a vertical transverse plan. Upper and lower crankshafts are intermittently driven through a one-revolution cycle often by a chain and sprocket drive mechanism. After sweeping or pushing the load, the device must be raised, moved back to its starting point and lowered on the next load.

SUMMARY OF THE INVENTION

In summary, the invention is an apparatus for transferring articles. The apparatus includes a layer formation table. The apparatus also includes means for supplying articles to the layer formation table. At least one row of the articles is formed at a first end of the layer formation table. The apparatus also includes a programmable robot including an end of arm tool for transferring the at least one row of the articles towards a second end of the layer formation table. The programmable robot is configured to form a plurality of rows of articles on the layer formation table. Each of the rows comprises a plurality of articles in side by side contact creating a void between adjacent articles in each of the rows. The programmable robot is configured to nest the articles of one of the rows in the voids of an adjacent row. The end of arm tool includes a multiplicity of guides which form lanes. The rows of articles fill the lanes. The end of arm tool includes clamping tools which lock the individual rows of articles between the guides.

DETAILED DESCRIPTION OF EXEMPLARY EMBODIMENT

A case/bulk layer formation table is disclosed including a multi-axis programmable robot. In one embodiment, an EOAT on the cantilevered arm of the robot can be designed to transfer rows of bulk product (such as, by way of example and not limitation, bottles) or cases.

A process for transferring articles can comprise the steps of: providing a layer formation table; supply articles to the layer formation table; forming at least one row of the articles at a first end of the table; and providing a programmable robot including an EOAT for transferring the row of the articles towards a second end of the table. The process can further comprise the step of configuring the robot to build a tier of products on the layer formation table.

Figure 1:
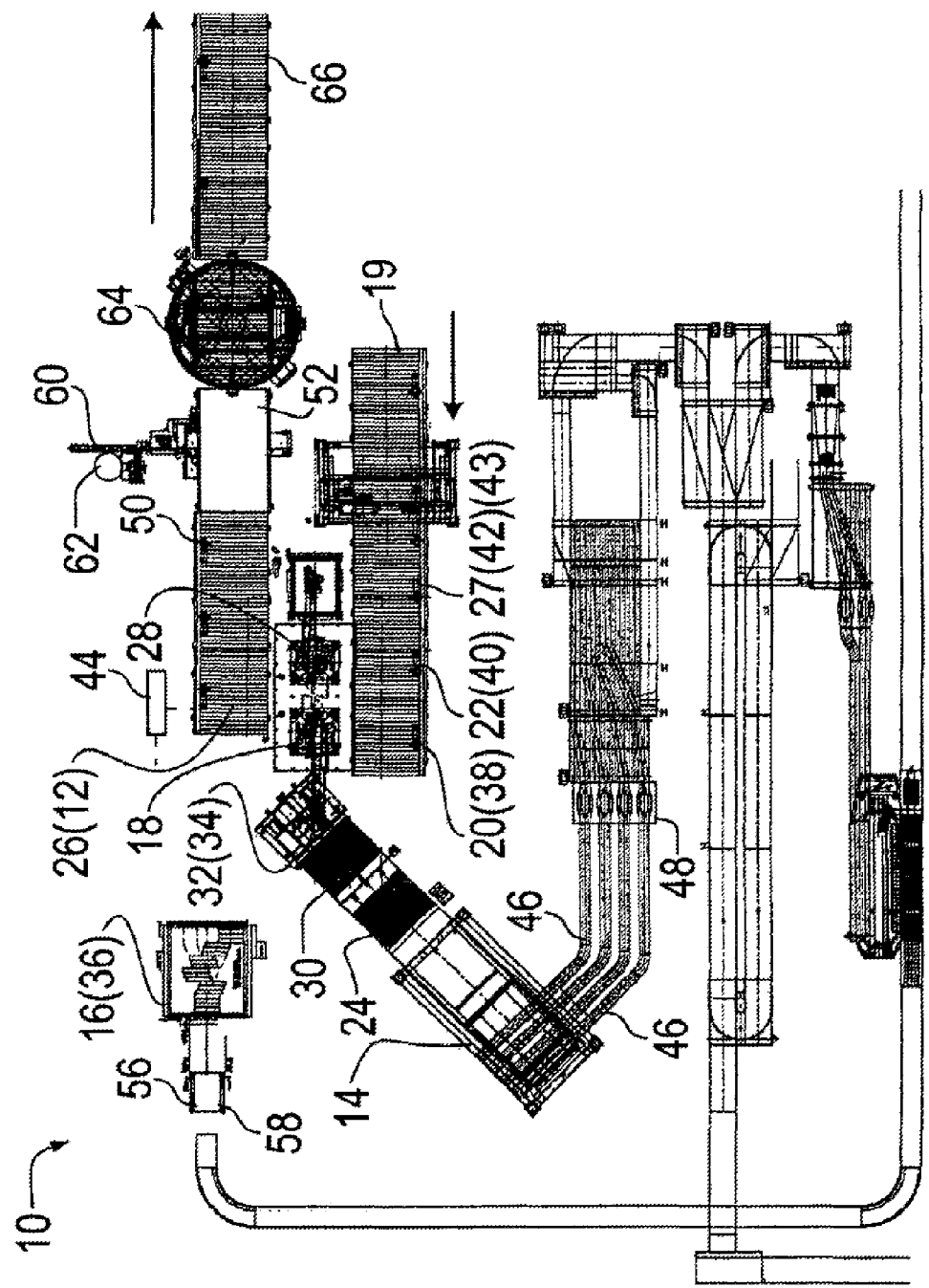
FIG. 1 is a top schematic view showing a packaging system in which an exemplary embodiment of this disclosure may be used.

FIG. 1 shows system 10 for packaging load 12 comprising bulk product feeder 14, tier case station 16 and programmable, articulate robot 18. Dunnage supply line 19 feeds system 10. System 10 also includes pallet station 20, tier sheet station 22, tier staging area 24, load build area 26, top frame station 27, programmable, articulate, robot 28 and tier pick up area 30. Robot 18 is a single means for placing tiers 32 of the bulk product 34 or cases 36 in load build area 26. Robot 28 is a single means for placing pallets 38, tier sheets 40 and top frame 42 in load build area 26. Robot 18 picks up tier 32 at tier pickup area 30 and discharges it at load build area 26.

In one embodiment, robot 18 picks up case 36 from tier case station 16 and places them in load building area 26. The two robot system provides flexibility in that the line can still run if one side is down for repair, maintenance or product set up. In this embodiment, robot 28 picks up top cap 43 instead of top frame 42. Pallets, tiers, tier sheets, top frames and top caps often are referred to as dunnage.

Bulk product feeder 14 typically comprises a multiplicity of parallel conveyor belts 46 which carry rows of bulk product 34 (bottles). Frame 48 support belts 46. The rows are fed to the tier staging area 24. Tier staging area 24 typically includes a conveyor which comprises frames and supporting feed belts. Usually tier staging area 24 is at the end of bulk product feeder 14.

Tier case station 16 typically comprises a multiplicity of parallel conveyor belts 56 which carry cases 36 of product 34 (bottles). Frame 58 support belts 56. The cases are fed to load build area 26 for pick up by robot 18.

Cases as used herein may vary widely. Typically cases means a case of 24 beer bottles. Cases may include a 6 pack, 12 pack, 18 pack, 30 pack and the like. The case may be corrugated cases, chip board cases or film wrapped bundles of product. A typical film wrapped case is a film wrapped package of six or twelve rolls of paper towels.

Tier sheet station 22 comprises conveyor which includes a frame supporting rollers. Tier sheet station 22 is next to pallet station 20 and also parallel to load build area 26. Robot 28 picks up pallet 38 from pallet station 20 and locates it at load build area 26. This is followed sequentially by alternating layers of tier sheet 40 and tier 32 (cases 36). In one embodiment where no pallet 38 is employed, the first layer is tier sheet 40.

The rows of product 34 form tier 32 on a conveyor. The conveyor then transports tier 32 to tier staging area 24. As will be shown later, tier 32 is located in load build area 26 by robot 18. Dunnage supply line 19 provides pallets 38 to pallet station 20 and top frames 42 to top frame station 28. Line 19 feeds to stations 20 and 28. Pushers such as chain transfers 54 and 56 move pallets 38 and top frames 42 to stations 20 and 28, respectively.

Pallet station 20 comprises conveyors which includes frames supporting a multiplicity of rollers. Pallet station 20 usually is near load build area 26. Tier sheet station 22 comprises conveyors, frames and a multiplicity of rollers.

Dunnage line 19 comprises conveyors which includes frames supporting a multiplicity of rollers.

Top frame station 28 comprises conveyors which includes a frame supporting a multiplicity of rollers.

When the tier comprises cases 36, top frame station 28 feeds top caps 43 instead of top frames 42.

Load conveyor 50 removes load 12 from load building area 26. Conveyor 50 comprises frames and rollers. Typically, conveyor 50 transfers load 12 strapping area 52.

FIG. 1 also shows control 44, which may be a programmable logic controller (PLC), and power control panel to operate system 10 through conventional circuitry not shown. Control 44 controls robot 18 and robot 28 and co-ordinates their operation with dunnage line 19, feeder 14 and station 16.

PLCs in a control panel controls system 10, the load and dunnage conveying system. The PLCs in the control panel controls the tier building system. PLCs interface with the control, which controls robot 18 and robot 28. PLCs also interface with other PLCs and can be the main control for system 10. Power control panels are wired to their respective drives and sensors and actuators.

FIG. 1 also shows strapper 60 which straps load 12. Control 62 controls strapper 60. While strapping preferably is used for bulk product 34, strapping may be used with cases 36 as well. Orienting station 64 can turn load 12 after a first strapping and can send load 12 back to station 60 for a second strapping perpendicular to the first. Load 12 then moves down conveyor 66 to storage or shipping.

Figure 2:
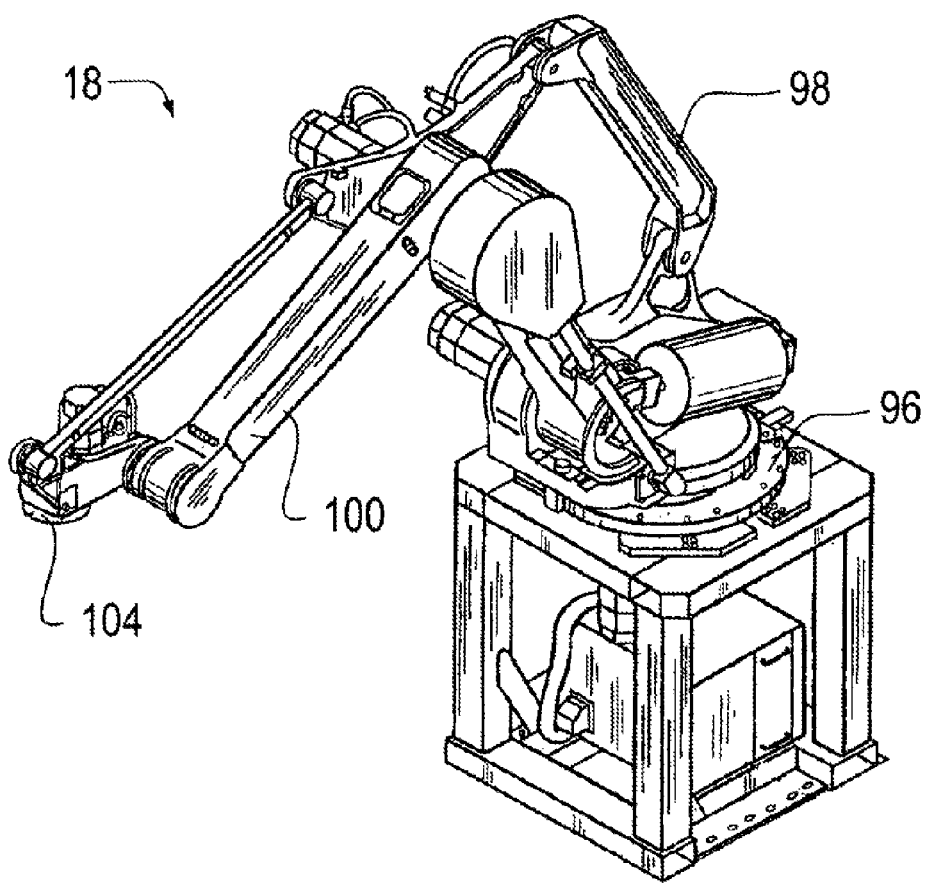
FIG. 2 is a perspective view of a programmable multi-axis robot used with an exemplary embodiment of this disclosure.

FIG. 2 shows robot 18 or 28 in greater detail. For this drawing, robot 18 will be used to illustrate either robot. Robot 18 mounts on main rotary axis 96 and can rotate 360° about axis 96. Robot 18 also includes main support post 98 extending vertically from axis 96. Cantilevered arm 100 extends from post 98 and carries end effector 102. Effector 102 is capable of locating tiers 32 or cases 36 into load building area 26 to build load 12.

A distal end of cantilevered arm 100 carries mounting plate 104. Plate 104 attaches to arm 100 with conventional fasteners and effector 102 attaches to plate 104 with similar mechanical fasteners.

Robot 18 is a programmable multi-axis robot. Previously-discussed controllers controls robot 18. Typically the multi-axis robot 18 has five axes of motion. In another embodiment arm 100 may be a Cartesian arm.

Figure 3:
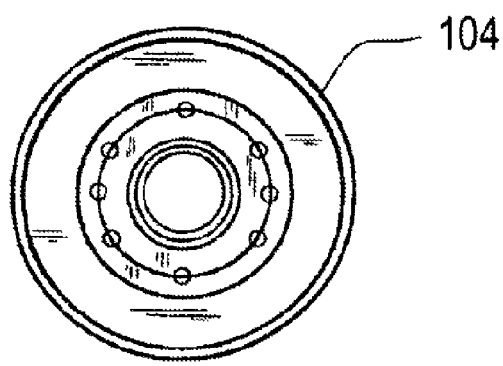
FIG. 3 shows the mounting plate of the robot of FIG. 2.

FIG. 3 shows mounting plate 104 in greater detail.

Figure 4:
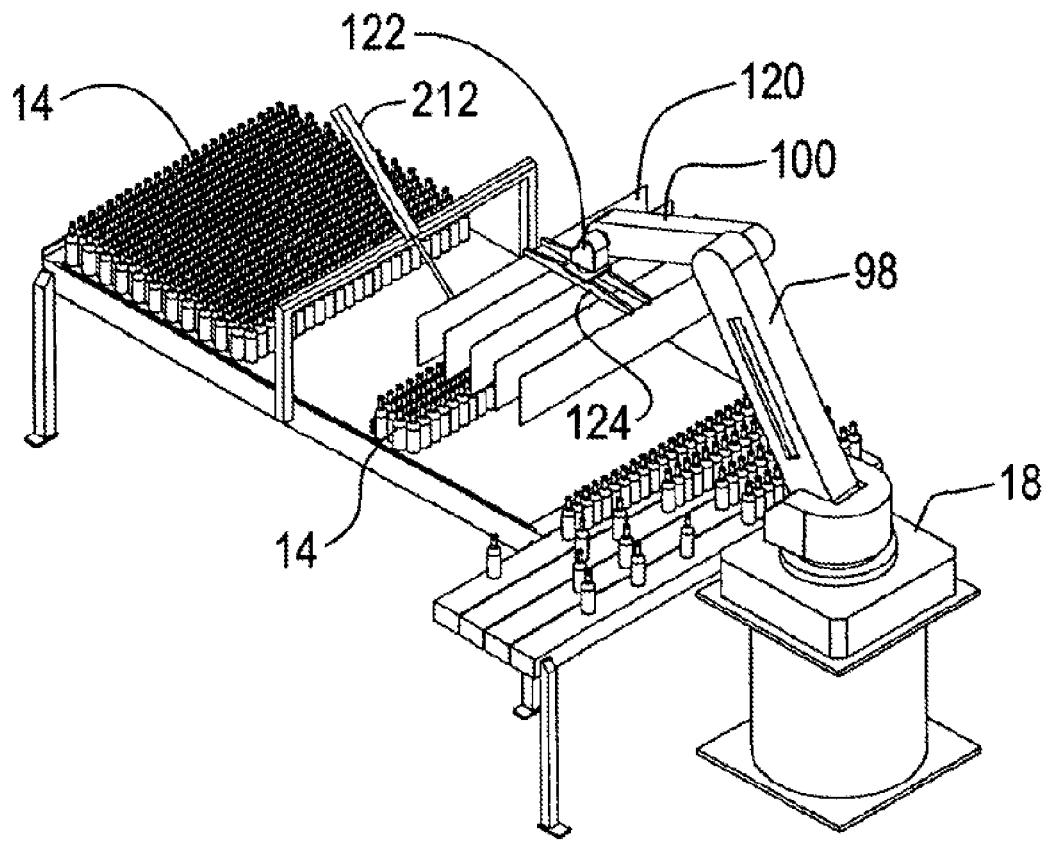
FIG. 4 is a schematic view showing an end of arm tooling (hereafter "EOAT") for sweeping rows of bulk product (bottles).

FIG. 4 is a schematic view showing EOAT 120 for sweeping rows of bulk product (bottles) 14. In system 10 of FIG. 1, robot 18 and EOAT 120 of this invention may be used in to load bulk product 14 or tier case station 16. EOAT 120 shown comprises a multiplicity of guides which form lanes. The rows of bottles fill the lanes. Cylinders 122 fire clamping tools 124 which lock the rows of bottles in the lanes between the guides. Robot 18 then sweeps the load down the conveyor to the next station. Clamping tools 122 are released and robot 18 lifts EOAT 120 and returns it to its starting position.

Figure 5:
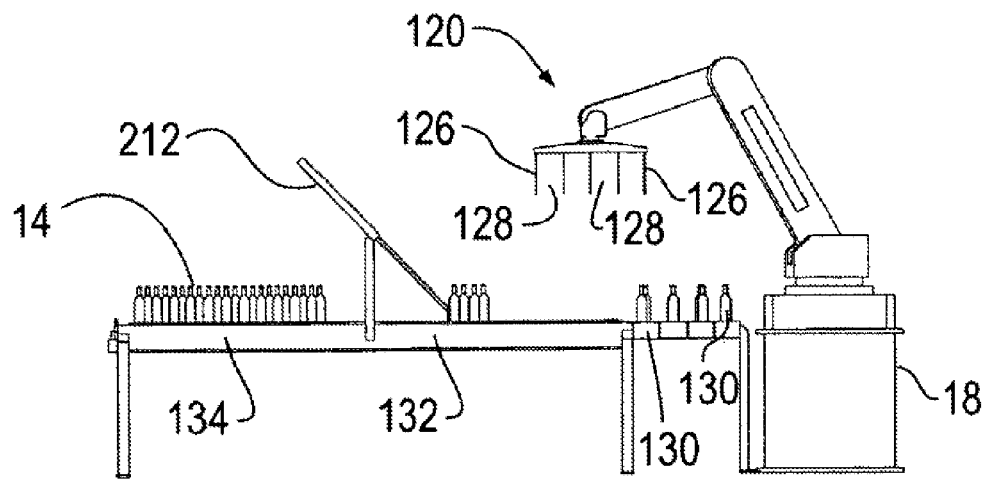
FIG. 5 is a side schematic view showing another view of the EOAT of FIG. 4 showing a pusher for sweeping cases of bulk product.

FIG. 5 is a side schematic view showing another view of EOAT 120 of FIG. 4 in greater detail. EOAT 120 comprises a multiplicity of guides 126 which forms lanes 128. Rows 130 of bottles 14 fill lanes 128. Robot 18 sweeps rows 130 down conveyor 132 to station 134. Tiers of product are built in staging area 202 by accumulating rows articles against tier accumulation stop 212. Tier accumulation stop 212 is configured to raise in order to allow the tiers of product to move down conveyor 132 to station 134.

In another embodiment EOAT 120 acts as a pusher and pushes cases of bulk product in rows 130 down conveyor 132 to station 134. In this embodiment, the EOAT is a pusher that pushes the cases down the conveyor instead of sweeping.

Figure 6:
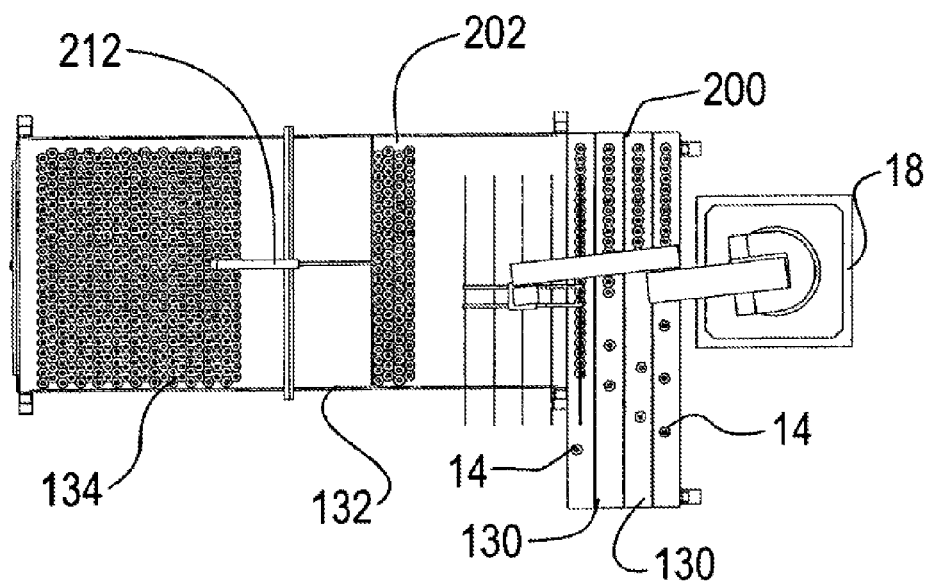
FIG. 6 is a top schematic view showing a grouping and transfer station receiving a continuous single file feed of bulk product (bottles).

FIG. 6 is a top schematic view showing a grouping and transfer station 200 receiving a continuous single file feed of bulk product (bottles) 14. In FIG. 6, the grouping and transfer station 20 receives continuous single file feed 130 of bottles 14, groups bottles 14 to rows of multiple bottles 14 abreast as illustrated. EOAT 120 transfers row 130 at right angles to the direction of the initial bottle feed to staging area 202. Robot 18 EOAT 120 of FIG. 4 sweep rows 130 onto downstream conveyor 132. Staging area 202, as well as a grouping area 200 are shown. Rows 130 are swept downstream to processing station 134.

Figure 7:
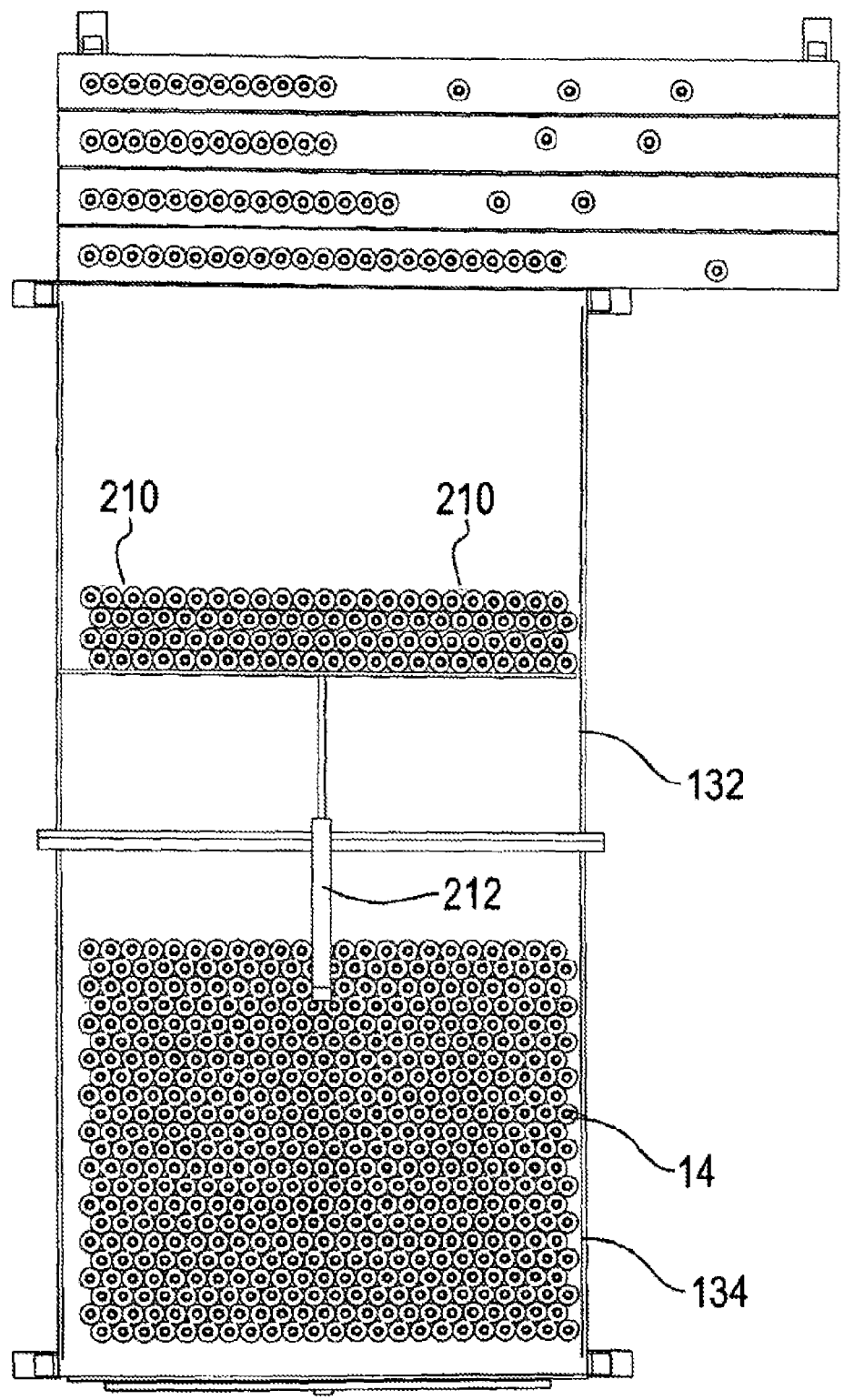
FIG. 7 is a top schematic view showing a grouping and transfer station so that adjacent rows are staggered so that the bottles are nested.

FIG. 7 is a top schematic view showing the grouping and transfer station of FIGS. 4-6 so that adjacent rows are staggered so that the bottles are nested in voids 210. This apparatus for packing articles, particularly bottles, in units each consisting of a plurality of parallel rows or articles, each row comprising a plurality of articles, in side by side contact, and with the rows in contact, comprising means for collating articles into units. Each unit of articles, as formed, is deposited on a conveyor and conveyed by the robot and EOAT of FIGS. 4-6. In collating cylindrical bottles (or other cylindrical articles), the rows are staggered for nesting of bottles 14 to reduce voids 210 in the units.

Figure 8:
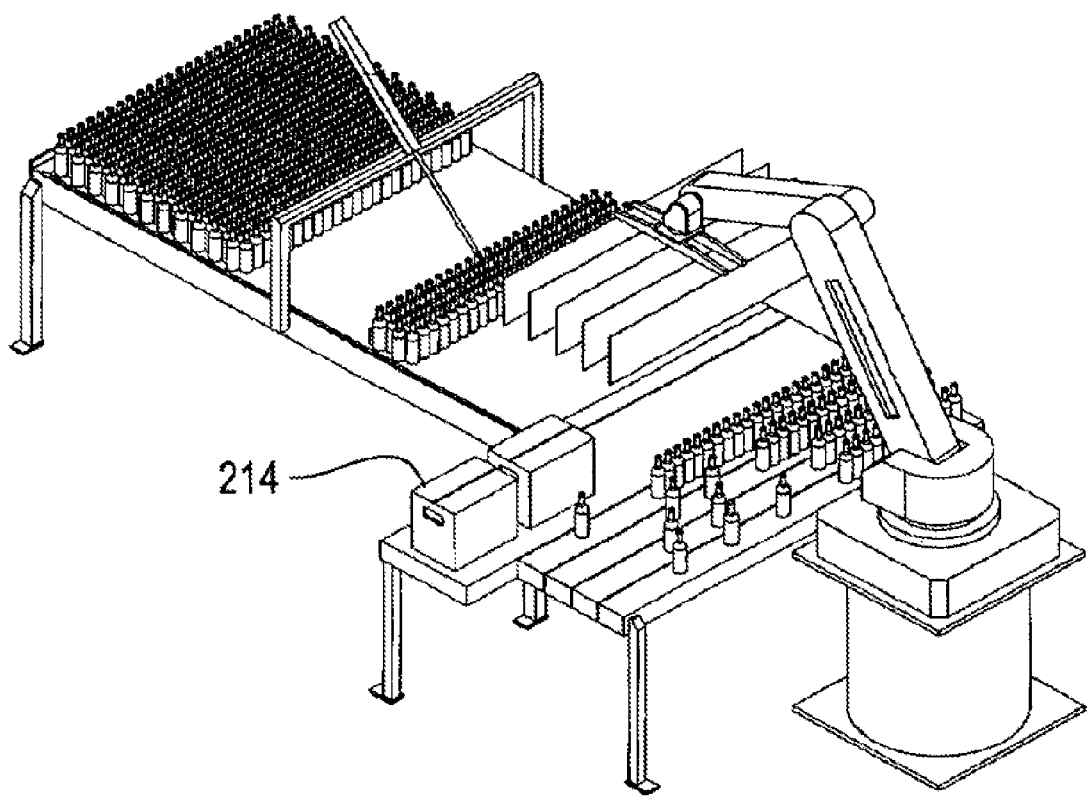
FIG. 8 is a schematic view showing cases of product being fed to the layer formation table.

FIG. 8 is a schematic view showing cases of product being fed to the layer formation table. Cases 214 are fed to station 200.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

What is claimed is:

1. An apparatus for transferring articles comprising:
a layer formation table;
a conveyor for supplying the articles to said layer formation table wherein at least one row of the articles is formed at a first end of said layer formation table;
a programmable robot including an end of arm tool for transferring the at least one row of the articles towards a second end of said layer formation table;
wherein said programmable robot is configured to form a plurality of rows of the articles on said layer formation table wherein each of the rows comprises a plurality of the articles in side by side contact creating a void between adjacent articles in each of the rows;
wherein said programmable robot is configured to nest the articles of one of the rows in the voids of an adjacent row while the articles are supported from respective bottoms of the articles;
wherein said end of arm tool includes a multiplicity of guides which form lanes wherein the rows of the articles fill said lanes; and
wherein said end of arm tool further comprises clamping tools which lock the individual rows of the articles between the guides.

2. The apparatus of claim 1 wherein said end of arm tool further comprises:
at least one cylinder that actuates said clamping tools.

3. The apparatus of claim 1 wherein said programmable robot is configured to build a tier of the articles on said layer formation table.

4. The apparatus of claim 1 wherein said programmable robot and said guides of said end of arm tool sweep the at least one row of the articles from said first end of said layer formation table towards said second end of said layer formation table.

5. The apparatus of claim 1 wherein the articles are further defined as bulk product.

6. The apparatus of claim 1 wherein the articles are further defined as containers.

7. The apparatus of claim 1 wherein the articles are further defined as bottles.

8. The apparatus of claim 1 wherein the articles are further defined as cans.

9. The apparatus of claim 1 wherein the articles are further defined as a case of product.

10. The apparatus of claim 1 wherein the articles are further defined as cases of product.

11. A method of transferring articles comprising:
supplying the articles to a layer formation table wherein at least one row of the articles is formed at a first end of the layer formation table;
transferring the at least one row of the articles towards a second end of the layer formation table with an end of arm tool mounted on a programmable robot;
forming a plurality of rows of the articles on the layer formation table with the programmable robot wherein each of the rows comprises a plurality of the articles in side by side contact creating a void between adjacent articles in each of the rows;
nesting the articles of one of the rows in the voids of an adjacent row with the programmable robot;
filling lanes formed by a multiplicity of guides of the end of arm tool with rows of the articles; and
locking the rows of the articles in the guides with a clamping tool.

12. The method of claim 11 further comprising the step of:
building a tier of the articles on the layer formation table with the programmable robot.

13. The method of claim 11 further comprising the step of:
sweeping the at least one row of the articles from the first end of the layer formation table towards the second end of the layer formation table with guides of the end of arm tool of the programmable robot.

14. The method of claim 11 further comprising the step of:
actuating the clamping tools with at least one cylinder.

15. An apparatus for transferring articles comprising:
a layer formation table;
a conveyor for supplying the articles to said layer formation table wherein at least one row of the articles is formed at a first end of said layer formation table;
a programmable robot including an end of arm tool for transferring the at least one row of the articles towards a second end of said layer formation table;
wherein said programmable robot is configured to form a plurality of rows of the articles on said layer formation table wherein each of the rows comprises a plurality of the articles in side by side contact creating a void between adjacent articles in each of the rows;
wherein said programmable robot is configured to nest the articles of one of the rows in the voids of an adjacent row while the articles are supported from respective bottoms of the articles;
wherein said programmable robot is configured to build a tier of the articles on said layer formation table;
wherein said end of arm tool includes a multiplicity of guides which form lanes wherein the at least one row of the articles fill said lanes;
wherein said end of arm tool further comprises clamping tools which lock the rows of the articles between the guides; and
wherein said programmable robot and said guides of said end of arm tool sweep the at least one row of the articles from said first end of said layer formation table towards said second end of said layer formation table.

16. The apparatus of claim 15 wherein said end of arm tool further comprises:
at least one cylinder that actuates said clamping tools.

17. The apparatus of claim 16 wherein said multiplicity of guides is further defined as including five guides defining four lanes.

18. The apparatus of claim 17 wherein the articles are further defined as containers.

19. The apparatus of claim 18 wherein the containers are further defined as bottles.

20. The apparatus of claim 19 wherein said programmable robot is further defined as configurable to push cases of the articles.

* * * * *